J. W. SACKETT.
SWIVEL AND EXTENSION CONNECTION FOR SUCTION PIPES OF HYDRAULIC DREDGES.
APPLICATION FILED DEC. 3, 1908.
933,116.
Patented Sept. 7, 1909.
3 SHEETS—SHEET 1.
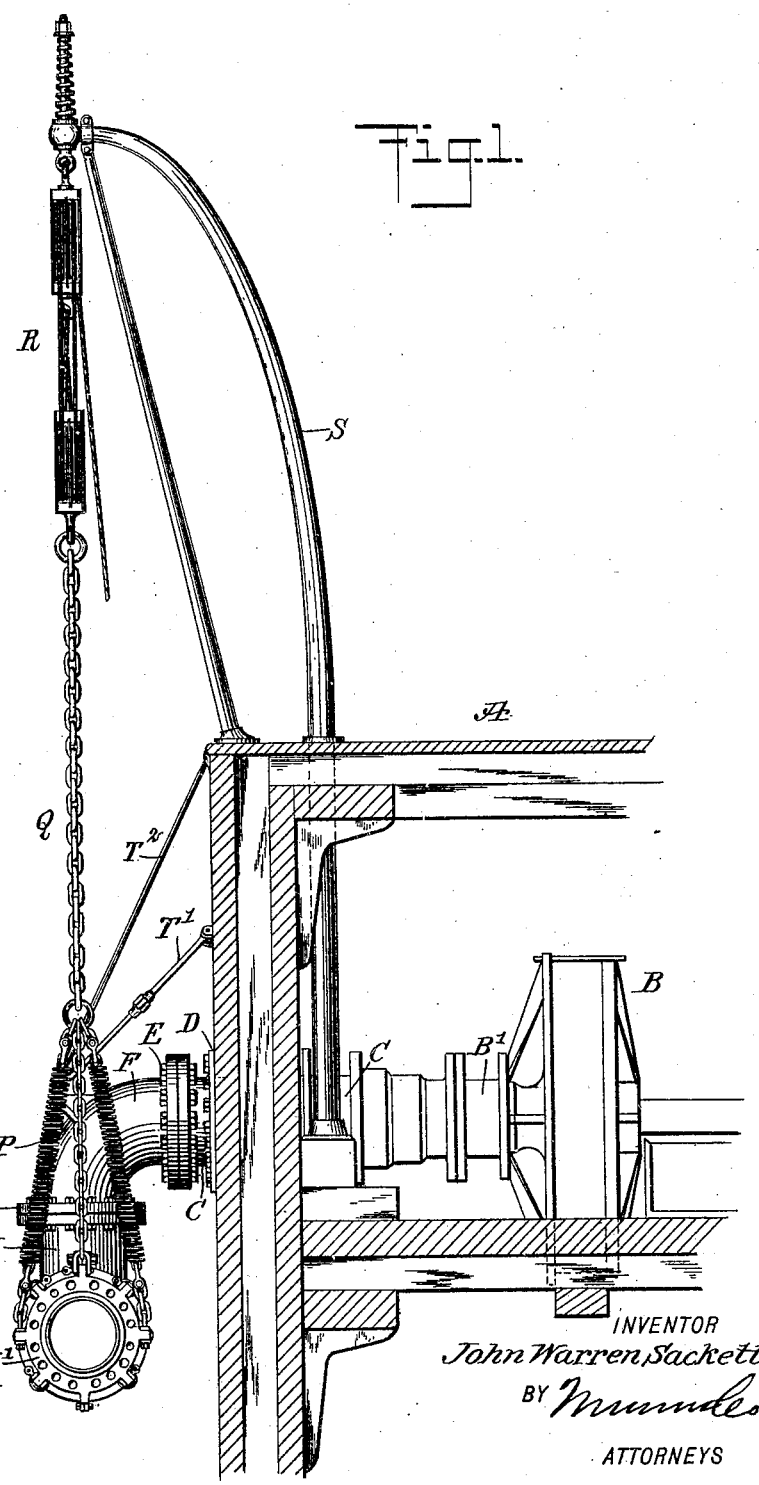

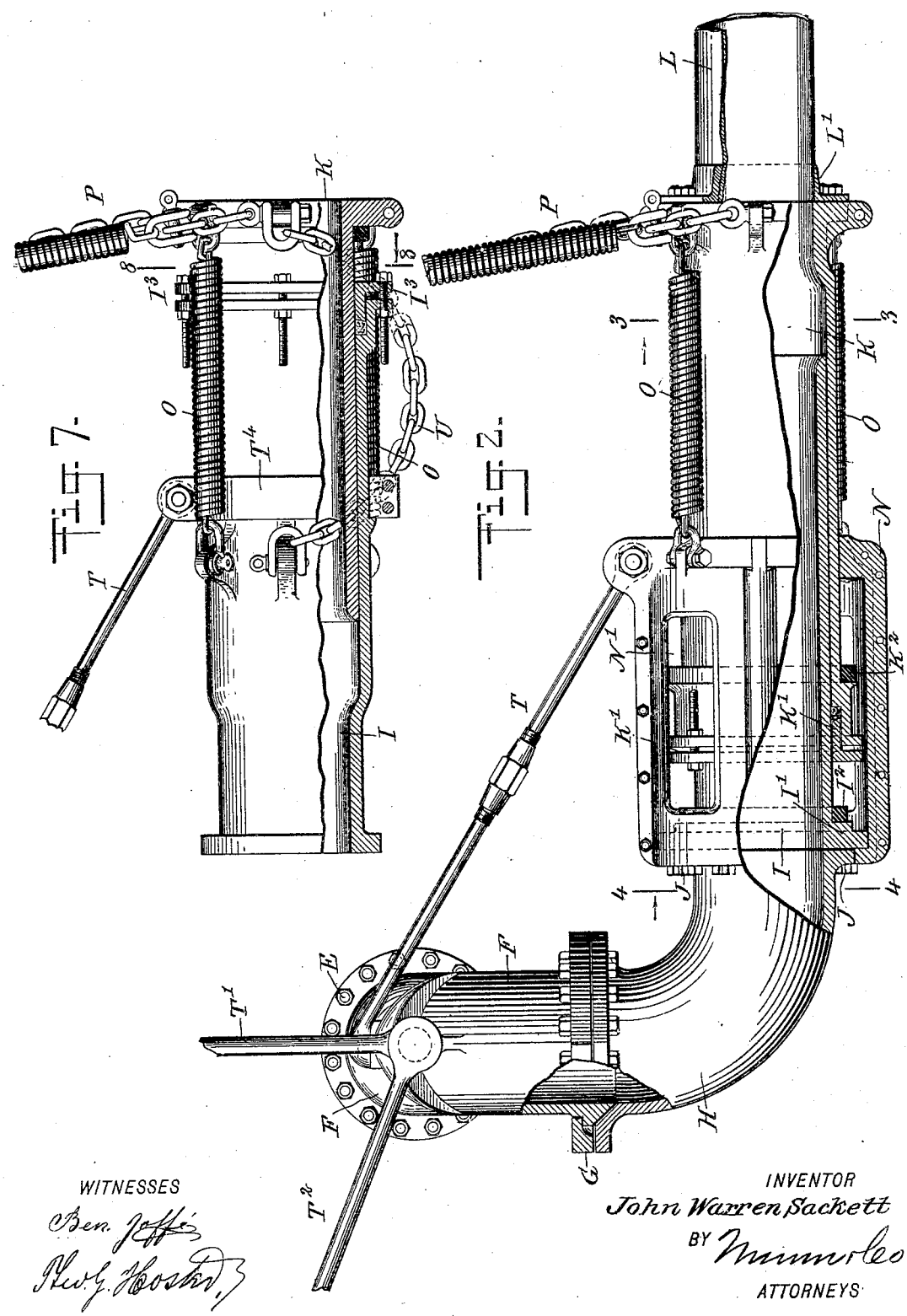

J. W. SACKETT.
SWIVEL AND EXTENSION CONNECTION FOR SUCTION PIPES OF HYDRAULIC DREDGES.
APPLICATION FILED DEC. 3, 1908.
933,116.
Patented Sept. 7, 1909.
3 SHEETS—SHEET 3.
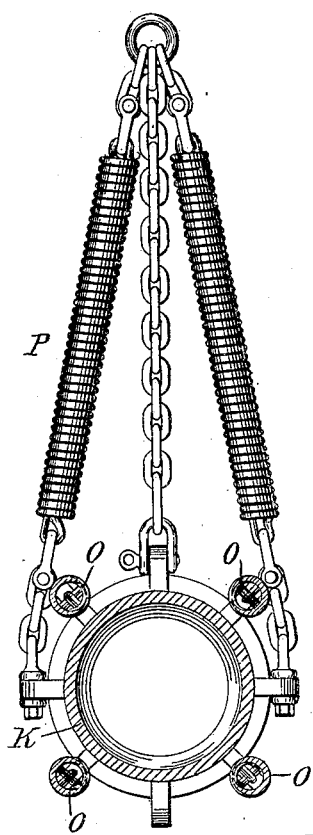
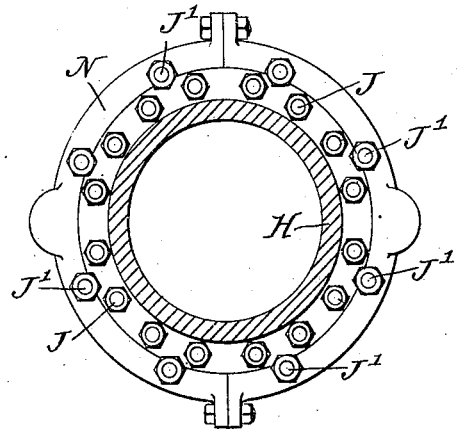
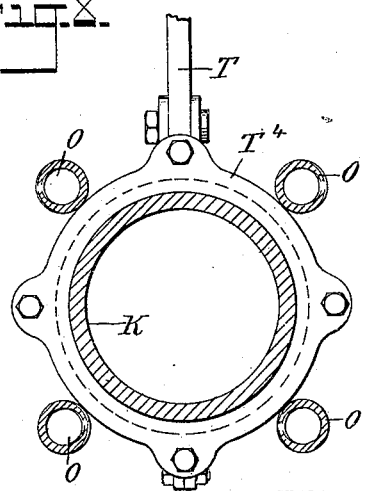
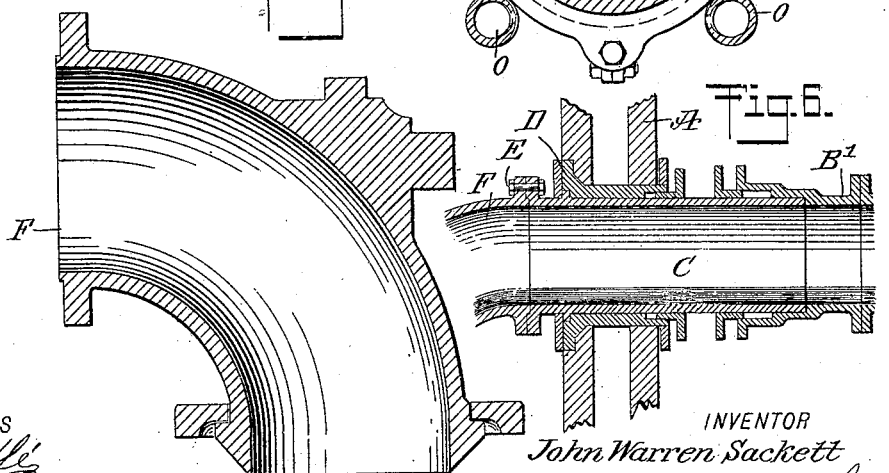
WITNESSES
INVENTOR
John Warren Sackett
BY
ATTORNEYS

UNITED STATES PATENT OFFICE.

JOHN WARREN SACKETT, OF JACKSONVILLE, FLORIDA.

SWIVEL AND EXTENSION CONNECTION FOR SUCTION-PIPES OF HYDRAULIC DREDGES.

933,116.  Specification of Letters Patent.  Patented Sept. 7, 1909.

Application filed December 3, 1908. Serial No. 465,791.

*To all whom it may concern:*

Be it known that I, JOHN WARREN SACKETT, a citizen of the United States, and a resident of Jacksonville, in the county of Duval and State of Florida, have invented a new and Improved Swivel and Extension Connection for Suction-Pipes of Hydraulic Dredges, of which the following is a full, clear, and exact description.

The invention relates to flexible connections for the suction pipes of hydraulic dredges, and its object is to provide a new and improved swivel and extension connection, designed to take the place of the ordinary suction hose and the ball and socket joint now used, and arranged to permit the drag to readily accommodate itself to irregularities in the bottom of the water-way to be dredged, and to change its relative position with respect to the dredge as the demands of the practical work require, and without causing any undue stresses on the suction pipe or the hull of the dredge.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a cross section of a hydraulic dredge provided with the improvement; Fig. 2 is an enlarged side elevation of the same, parts being in section; Fig. 3 is a transverse section of the same on the line 3—3 of Fig. 2; Fig. 4 is a similar view of the same on the line 4—4 of Fig. 2; Fig. 5 is an enlarged sectional side elevation of the upper elbow; Fig. 6 is a cross section of the swivel sleeve; Fig. 7 is a side elevation of a modified form of the improvement, parts being in section; and Fig. 8 is a cross section of the same on the line 8—8 of Fig. 7.

On the dredge A is mounted the usual suction pump B, having its inlet B' connected with a sleeve C mounted to turn in a suitable bearing D held in the side wall of the hull of the dredge A, as plainly indicated in Figs. 1 and 6. The outer end of the sleeve C is connected by bolts E with the upper elbow F, connected at its lower end by a swivel G with the lower elbow H, capable of turning on the elbow F by said swivel G to assume a desired position. The outer end of the lower elbow H connects with the inner end of the extension pipe section I having a flange I' fastened by bolts J to the outer end of the elbow H, and on the said extension pipe section I telescopes the extension pipe section K, to the outer end of which is secured the drag L. The inner end of the telescoping pipe section K is provided with a suitable stuffing box K', to form a tight joint between the sections I and K.

To the flange I' of the extension pipe section I is secured by bolts J' a sleeve or shell N, into which passes the inner or stuffing box end of the pipe section K, and on the latter is secured a bumping ring $K^2$ adapted to abut against the outer end of the sleeve N whenever the pipe section K is drawn suddenly out to its full extent. A similar bumping ring $I^2$ is held on the flange I', so that when the pipe section K is suddenly moved inward to its full extent its stuffing box K' abuts against the said ring $I^2$. Thus by the use of the bumping rings $K^2$ and $I^2$ all jar is taken up in case of a sudden outward or inward movement of the pipe section K on the pipe section I. The sleeve N is preferably made in two sections (see Fig. 4), for convenient attachment to the pipe section I, and the sleeve N is provided with slots N' for obtaining convenient access to the stuffing box K' for repairs or other purposes. The sleeve N is connected at its forward end by coil springs O with the forward end of the pipe section K, so as to normally hold the pipe section K in the position shown in Fig. 2, that is, with the stuffing box K' a distance from either end of the sleeve N. The springs O permit the section K to yield to torsional and to longitudinal stresses, that is, the springs O permit longitudinal movement of the pipe section K as well as turning of the pipe section K on the pipe section I.

The forward end of the pipe section K is hung on a spring sling P connected by a chain Q with a tackle R or other means for raising and lowering the extension connection, the tackle R being supported by a davit S erected on the dredge A, as indicated in Fig. 1. A stay T connects the outer end of the sleeve N with the upper elbow F at the axis of its lower opening, and the upper elbow F is also connected by a stay T' to the side of the dredge A, the stay T' being connected to the upper elbow F at the axis of the inner opening. Another stay T² connects the elbow F with the gunwale of the dredge A, to relieve stresses on the upper elbow on the sleeve C passing through the bearing D to the inside of the dredge.

In the modified forms illustrated in Figs. 7 and 8, the sleeve or shell N is dispensed with, and the telescoping pipe section K telescopes in the pipe section I and is connected with the latter by springs O, and the outward sliding movement of the pipe section K is limited by a chain U, normally slack, as indicated in Fig. 7. A stuffing box I³ is arranged on the outer end of the pipe section I, to render the joint between the telescoping pipe sections K and I tight, and the pipe section I is provided with a band T⁴, for attaching the stay T leading to the upper elbow F, as before explained and shown in Fig. 2.

By the arrangement described, the pipe section K carrying the drag L is free to move outward under tension or inward under compression; for instance, when the dredge A moves backward at the time the drag is on the bottom of the water-way. It is further understood that the spring sling P tends to maintain the outer pipe section K and the drag L in its proper position, but allows the pipe section K to turn on its own axis, within limits, and thereby permitting the drag to readily adapt itself to the irregularities of the bottom of the water-way. It will also be noticed that by rendering the device flexible, the drag accommodates itself to irregularities of the bottom of the water-way, and the drag is free to change its relative position with respect to the vessel, as the demands of practical work require, without causing undue stresses on the several parts of the suction pipe or upon the dredge itself.

Having thus described my invention, I claim as new and desire to secure by Letters Patent:

1. A flexible connection for the suction pipes of dredges, comprising a pair of elbows, of which one has a swivel connection with the other, and an extension pipe having a section fixed to the said swiveled elbows and a section movable on the fixed section.

2. A flexible connection for the suction pipes of dredges, comprising a pair of elbows, of which one has a swivel connection with the other, an extension pipe having a section fixed to the said swiveled elbows and a section movable on the fixed section, and springs connected with the said movable extension pipe section to allow the said movable extension pipe section to yield to torsional and longitudinal stresses.

3. A flexible connection for the suction pipes of dredges, comprising a pair of elbows, of which one has a swivel connection with the other, and an extension pipe having a section fixed to the said swiveled elbows and a section mounted to slide and to turn in the said fixed extension pipe section.

4. A flexible connection for the suction pipes of dredges, comprising a pair of elbows, of which one has a swivel connection with the other, an extension pipe having a section fixed to the said swiveled elbows and a section mounted to slide and to turn on the said fixed extension pipe section, and springs connected with the said movable extension pipe section to allow the latter to yield to torsional and longitudinal stresses.

5. A flexible connection for the suction pipes of dredges, provided with a pair of elbows, of which one has a swivel connection with the other.

6. A flexible connection for the suction pipes of dredges, provided with an extension pipe having telescoping sections, of which one is free to turn and to slide lengthwise in the other fixed section.

7. A flexible connection for the suction pipes of dredges, provided with an extension pipe having telescoping sections, of which one is free to turn and slide lengthwise in the other fixed section, and means for limiting the sliding movement of the said movable section.

8. A flexible connection for the suction pipes of dredges, provided with an extension pipe having telescoping sections, of which one is free to turn and to slide lengthwise in the other fixed section, and springs connected with the said movable section to hold the extension pipe in normal position, and to allow the movable section to yield to torsional and longitudinal stresses.

9. A flexible connection for the suction pipes of dredges, provided with an extension pipe having telescoping sections, of which one is free to turn and to slide lengthwise in the other fixed section, a sleeve at the inner end of the said fixed section, and lengthwise-extending coil springs connecting the said sleeve with the movable section.

10. A flexible connection for the suction pipes of dredges, provided with an extension pipe having telescoping sections, of which one is free to turn and to slide lengthwise in the other fixed section, a sleeve at the inner end of the said fixed section, lengthwise-extending coil springs connecting the said sleeve with the movable section, a spring sling connected with the outer end of the said movable section, and a raising and lowering device connected with the said spring sling.

11. A flexible connection for the suction pipes of dredges, provided with an extension pipe having telescoping sections, of which one is free to turn and to slide lengthwise in the other fixed section, and a spring sling connected with the outer end of the movable section.

12. A flexible connection for the suction pipes of dredges, comprising a pump suction pipe, a pair of elbows having a swivel connection, a swivel sleeve connecting the outer end of the said pump suction pipe with one of the elbows, and a sectional telescoping extension pipe having one pipe section attached to the outer end of the other elbow, and a spring sling connected with the outer end of the extension pipe.

13. A flexible connection for the suction pipes of dredges, comprising a pump suction pipe, a pair of elbows having a swivel connection, a swivel sleeve connecting the outer end of the said pump suction pipe with one of the elbows, and a sectional telescoping extension pipe having one pipe section attached to the outer end of the other elbow and a spring sling connected with the outer end of the extension pipe, a sleeve secured to the inner end of the extension pipe, and springs connecting the sleeve with the outer end of the said extension pipe.

14. A flexible connection for the suction pipes of dredges, provided with an extension pipe having telescoping sections, of which one is free to turn and to slide lengthwise in the other fixed section, a sleeve fixed to the inner end of the said fixed section, and buffers for the said sections.

15. A flexible connection for the suction pipes of dredges, comprising a pair of elbows, of which one has a swivel connection with the other, an extension pipe having a section fixed to the said swiveled elbows and a section movable on the fixed section, a sleeve fixed to the inner end of the said fixed section, and a stay connecting the said sleeve with the upper elbow at the outlet end.

16. A flexible connection for the suction pipes of dredges, comprising a pump suction pipe, a pair of elbows having a swivel connection, a swivel sleeve connecting the outer end of the said pump suction pipe with one of the elbows, a sectional telescoping extension pipe having one pipe section attached to the outer end of the other elbow, and stays connecting the dredge with the upper elbow at the outer end thereof.

In testimony whereof I have signed my name to this specification in the presence of two subscribing witnesses.

JOHN WARREN SACKETT.

Witnesses:
  WILLIAM T. JOTTER,
  FRANCIS M. WILLIAMS.